(12) United States Patent
Boone et al.

(10) Patent No.: US 12,468,818 B2
(45) Date of Patent: *Nov. 11, 2025

(54) REMEDIATION OF REGULATORY NON-COMPLIANCE

(71) Applicant: Kyndryl, Inc., New York, NY (US)

(72) Inventors: Michael Boone, Lutz, FL (US); Evelyn R. Anderson, Houston, TX (US); Natalie Brooks Powell, Bolingbrook, IL (US); Michael Bender, Rye Brook, NY (US)

(73) Assignee: Kyndryl, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/621,859

(22) Filed: Mar. 29, 2024

(65) Prior Publication Data

US 2024/0241966 A1 Jul. 18, 2024

Related U.S. Application Data

(63) Continuation of application No. 16/929,554, filed on Jul. 15, 2020, now Pat. No. 11,971,995.

(51) Int. Cl.
  *G06F 21/57* (2013.01)
  *G06F 11/34* (2006.01)
  (Continued)

(52) U.S. Cl.
  CPC ........ *G06F 21/577* (2013.01); *G06F 11/3438* (2013.01); *G06F 21/56* (2013.01);
  (Continued)

(58) Field of Classification Search
  CPC .... G06F 21/577; G06F 11/3438; G06F 21/56; G06F 21/6245; G06F 2201/81; G06F 2221/034; G06Q 10/0635; H04L 67/306
  See application file for complete search history.

(56) References Cited

U.S. PATENT DOCUMENTS 6,789,215 B1 * 9/2004 Rupp .................. G06F 8/61
  714/38.14
9,654,965 B2   5/2017 Kennedy
  (Continued)

FOREIGN PATENT DOCUMENTS

CN   101527712 A  *  9/2009
CN   102314424 A     1/2012
  (Continued)

OTHER PUBLICATIONS

Logan Lebanoff, "Automatic Detection of Vague Words and Sentences in Privacy Policies", 2018, Department of Computer Science, UCF, pp. 1-10. (Year: 2018).*
  (Continued)

*Primary Examiner* — Tan D Nguyen
(74) *Attorney, Agent, or Firm* — Erik Swanson; Andrew M. Calderon; Calderon Safran & Wright P.C.

(57) ABSTRACT

Hardware and software on a computing device is analyzed based on a regulatory profile for the computing device and regulatory compliance for an entity associated with the computing device. A determination is made whether at least one of the hardware and software on the computing device includes at least one regulatory non-compliance issue. In response to determining that at least one of the hardware and software on the computing device includes at least one regulatory non-compliance issue, one or more scripts are executed on the hardware and software on the computing device to cause the hardware and software to resolve the at least one regulatory non-compliance issue based on the regulatory profile for the computing device.

20 Claims, 4 Drawing Sheets

(51) Int. Cl.
| | |
|---|---|
| *G06F 21/56* | (2013.01) |
| *G06F 21/62* | (2013.01) |
| *G06Q 10/06* | (2023.01) |
| *G06Q 10/0635* | (2023.01) |
| *H04L 67/306* | (2022.01) |

(52) U.S. Cl.
CPC ..... *G06F 21/6245* (2013.01); *G06Q 10/0635* (2013.01); *H04L 67/306* (2013.01); *G06F 2201/81* (2013.01)

(56) References Cited

U.S. PATENT DOCUMENTS

| | | | |
|---|---|---|---|
| 10,063,594 | B2 | 8/2018 | Winn |
| 10,171,310 | B2 | 1/2019 | Hernandez |
| 10,200,413 | B1 | 2/2019 | Flowerday |
| 10,275,776 | B1 | 4/2019 | Watson |
| 2004/0138872 | A1 | 7/2004 | Nir |
| 2007/0140479 | A1 | 6/2007 | Wang |
| 2010/0205657 | A1 | 8/2010 | Manring et al. |
| 2012/0016802 | A1 | 1/2012 | Zeng et al. |
| 2012/0310850 | A1 | 12/2012 | Zeng et al. |
| 2012/0331567 | A1* | 12/2012 | Shelton .................. G06Q 10/00 726/28 |
| 2013/0268994 | A1* | 10/2013 | Cooper .................. H04L 63/20 726/1 |
| 2013/0340089 | A1 | 12/2013 | Steinberg et al. |
| 2017/0118074 | A1 | 4/2017 | Feinstein |
| 2017/0264480 | A1 | 9/2017 | Delegard |
| 2018/0121931 | A1 | 5/2018 | Bender |
| 2018/0150475 | A1 | 5/2018 | Hrebicek |
| 2018/0324218 | A1 | 11/2018 | Xie et al. |
| 2019/0018968 | A1 | 1/2019 | Ronca |
| 2019/0333071 | A1 | 10/2019 | Degeneffe |
| 2019/0340551 | A1 | 11/2019 | Moore |
| 2020/0044916 | A1 | 2/2020 | Kaufman |
| 2021/0019706 | A1* | 1/2021 | Bhalla .............. G06Q 10/06315 |
| 2021/0073449 | A1* | 3/2021 | Segev ..................... G06F 30/27 |
| 2021/0182926 | A1 | 6/2021 | Acharya et al. |
| 2021/0200950 | A1 | 7/2021 | Basu et al. |

FOREIGN PATENT DOCUMENTS

| | | | | |
|---|---|---|---|---|
| CN | 107015895 | A | 8/2017 | |
| CN | 101652783 | A * | 3/2020 | ........... G06F 21/552 |
| WO | WO-2010061801 | A1 * | 3/2010 | ............... H04L 9/08 |
| WO | 2012061473 | A1 | 5/2012 | |
| WO | WO-2020060231 | A1 * | 10/2013 | ........... H04L 41/142 |
| WO | 2015191609 | A1 | 12/2015 | |
| WO | 2016183348 | A1 | 11/2016 | |
| WO | 2016203230 | A1 | 12/2016 | |

OTHER PUBLICATIONS

Md. Tanzim Khorshed, "A Survey on gaps, thread remediation challenges . . . Cloud Computing," 2012, Future Generation Computing System, pp. 833-851. (Year: 2012).*

G. Priyadharshini, "Strategy and Solution to comply with GDPR Guideline to comply major articles and save penalty from non-compliance," 2018, 2nd International Conference on I-SMAC, IEEE Explore, pp. 190-195. (Year: 2018).*

William Mahoney, "An integrated framework for control system simulation and regulatory compliance monitoring," 2011, International Journal of Critical Infrastructure Protection, pp. 41-53. (Year: 2011).*

Mohammad Hamdaga, "An Approach based on citation analysis to support effective handling of regulatory compliance," Apr. 2011, Future Generation Computer Systems, vol. 24, Issue 4, pp. 395-410. (Year: 2011).*

List of KYNDRYL Patents or Patent Applications Treated as Related, dated Mar. 28, 2024, 2 pages.

Quill et al., "Automating Legal Compliance Documentation for IoT Devices on the Network", 978-1-5386-4980-0/19, © 2019 IEEE, 5 pages.

Subahi et al., "Ensuring Compliance of IoT Devices With Their Privacy Policy Agreement", 2018 IEEE 6th International Conference on Future Internet of Things and Cloud, DOI 10.1109/FiCloud. 2018.00022, 8 pages.

Giaretta et al., "IoT Security Configurability With Security-by-Contract", Sensors 2019, 19, 4121; doi: 10.3390/s19194121, 26 pages, <http://www.mdpi.com/journal/sensors>.

Mitra, Arnab, "Update Compliance on Co-Managed Devices", Argon Systems, © Microsoft, Printed Mar. 31, 2020, 15 pages.

Becerra, Xavier, "California Consumer Privacy Act (CCPA)", State of California Department of Justice, © 2020 DOJ, 5 pages, <https://www.oag.ca.gov/privacy/ccpa>.

Jason Fitzsimmons, "Interaction between feasibility and desirability in the formation of entrepreneurial intentions", 2011, Journal of Business Venturing, vol. 26, pp. 431-440. (Year: 2011).

Farzad Sabahi, "Cloud Computing Security Threats and Responses", 2011, IEEE, pp. 1-5. (Year: 2011).

Avanish Pandey, "Cloud Computing: Security Issues and Research Challenge", Dec. 2011, IRACST, vol. 1, No. 2, pp. 136-146 (Year: 2011).

Lan Zhou, "Achieving Secure Role-Based Access Control on Encrypted Data in Cloud Storage", 2013, IEEE, Year: 2013, 15 pages.

* cited by examiner

300

| OPERATING SYSTEM (OS) COMMAND | OPERATING SYSTEM (OS) COMMAND |
|---|---|
| hostname >aisysinfo.log; | cat /etc/security/login.cfg >aisec_login.log; |
| oslevel -r >>aisysinfo.log; | cat /etc/sudoers >aisudoers.log; |
| oslevel -s >i>aisysinfo.log; | cat /etc/ssh/sshd_config >aisshd_config.log; |
| uname -L >>aisysinfo.log; | cat /etc/syslog.conf >aisyslog_conf.log; |
| uptime >>aisysinfo.log; | cat /etc/security/lastlog >ailastlog.log; ** |
| lsvg -o \| lsvg -il >ailsvg.log; | last >ailast.log; |
| df -k >aidf-k.log; | cat /var/adm/sulog >aisulog.log; |
| cat /etc/environment >aienv.log ; | cat /var/adm/sudo.log >ai>aisudolog.log; |
| cat /etc/profile >aiprofile.log; | cat /var/log/sudo.log >ai>aisudolog.log; |
| cat /etc/passwd >aipasswd.log; | lsitab -a >ailsitab-a.log; |
| cat /etc/group >aigroup.log; | ls -al / >ails-al.log; |
| cat /etc/security/group >aisec_groupi.log; | cat /etc/inetd.conf >aiinetd.log; |
| cat /etc/security/passwd >aisec_passi.log;** | ps -deaf >aips-deaf.log; |
| cat /etc/security/user >aisec_useri.log ; | netstat -an \|grep -i LIST >ainetstat-an; |
| lsuser -f ALL >ailsuser-fi.log; ** | cat /etc/ftpusers >aiftpusers.log; |
| lsgroup -f ALL >ailsgroup-fi.log; | Note - ** commands described below |

| OS COMMAND AND ASSOCIATED FUNCTION |
|---|
| cat /etc/security/passwd >aisec_passi.log; - Reads the Password file on an AiX system and writes to the file 'aisec_passi.log' which contains the following information: name; password; user ID; group ID; gecos; home directory; and shell. Each attribute is separated from the adjacent attributes by colons but with no spaces. This will be used by the cognitive system to determine whether the current state for Password related requirements in a Regulation are in compliance. |
| cat /etc/security/lastlog >ailastlog.log; - Reads the Logon information for users on an AIX system and writes the contents to the file 'ailastlog.log' which contains the following information: Time and date of last login; Host name of the last login; Count of unsuccessful logins; Time and date of last unsuccessful login; and Host name of unsuccessful login. This will provide to the cognitive system the current state of Logon activity. The cognitive system will determine if the state is in compliance of the related Regulatory requirements. The cognitive system will also use the provided states to determine if there is an attempted security breach and alert the proper stakeholders. |
| lsuser -f ALL >ailsuser-fi.log; - Gathers all of the users on a system and writes the contents to file 'ailsuser-fi.log' which contains the following information: Account name; Account Locked/Unlock state; Login retries; Password settings. This information will be used by the cognitive system to determine if the current state is compliant with related Regulatory requirements. |

FIG. 3B

REMEDIATION OF REGULATORY NON-COMPLIANCE

BACKGROUND

The present invention relates generally to the field of regulatory compliance, and more particularly to providing for remediation of regulatory non-compliance.

Many entities are required to follow any number of regulations. Such entities include, but are not limited to, businesses and corporations, governmental agencies, institutions of higher education (e.g., colleges and universities), financial institutions, non-profit organizations, and the like. Countless regulations help to govern the entities themselves and the computing devices used by said entities. Types of regulations the entities must adhere to include, but are not limited to, security regulations (i.e., regulations to prevent the loss of proprietary information), privacy regulations (i.e., regulations to prevent the loss of sensitive, personal information), financial regulations (i.e., regulations for reporting the financial health of the entity), and many others. Another regulatory consideration concerns the location of the entity as one state in the U.S., or one country in the world, may have comparable regulations with minor variations or totally different regulations. Non-compliance with regulations can impact the entities to varying degrees—from a warning, to a fine, to a loss of business.

SUMMARY OF THE INVENTION

Embodiments of the present invention include an approach for providing for the remediation of regulatory non-compliance. In one embodiment, hardware and software on a computing device is analyzed based on a regulatory profile for the computing device and regulatory compliance for an entity associated with the computing device. A determination is made whether at least one of the hardware and software on the computing device includes at least one regulatory non-compliance issue. In response to determining that at least one of the hardware and software on the computing device includes at least one regulatory non-compliance issue, one or more scripts are executed on the hardware and software on the computing device to cause the hardware and software to resolve the at least one regulatory non-compliance issue based on the respective regulatory profile for the computing device.

BRIEF DESCRIPTION OF THE DRAWINGS

FIG. 3A depicts a set of exemplary examples of operating system (OS) commands, in accordance with an embodiment of the present invention;

FIG. 3B depicts select OS commands and their associated functions, in accordance with an embodiment of the present invention.

DETAILED DESCRIPTION

Embodiments of the present invention recognize that device compliance to meet security and privacy requirements is important to demonstrate regulatory compliance to conduct business. With tens, hundreds, or maybe even thousands of regulations in place from internal requirements, governmental requirements, and requirements from worldwide organizations like the General Data Protection Regulation (GDPR) from the European Union (EU), demonstrating this compliance may be a daunting task requiring many man-hours of effort and excessive cost to the corporation. Repercussions for not being able to demonstrate regulatory compliance can range from mild to quite serious.

Embodiments of the present invention recognize that there may be a method, computer program product, and computer system for providing for the remediation of regulatory non-compliance via a cognitive system. In an embodiment, the method, computer program product, and computer system receives configuration information relating to a corporation, retrieves public and private data about the corporation to supplement the configuration information, determines applicable regulations at both the corporate and site level, and determines whether the corporation and site are in regulatory compliance. Further, in response to determining that at least one of the corporation or a site is not in compliance, the method, computer program product, and computer system can execute commands to resolve the compliance issue(s).

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
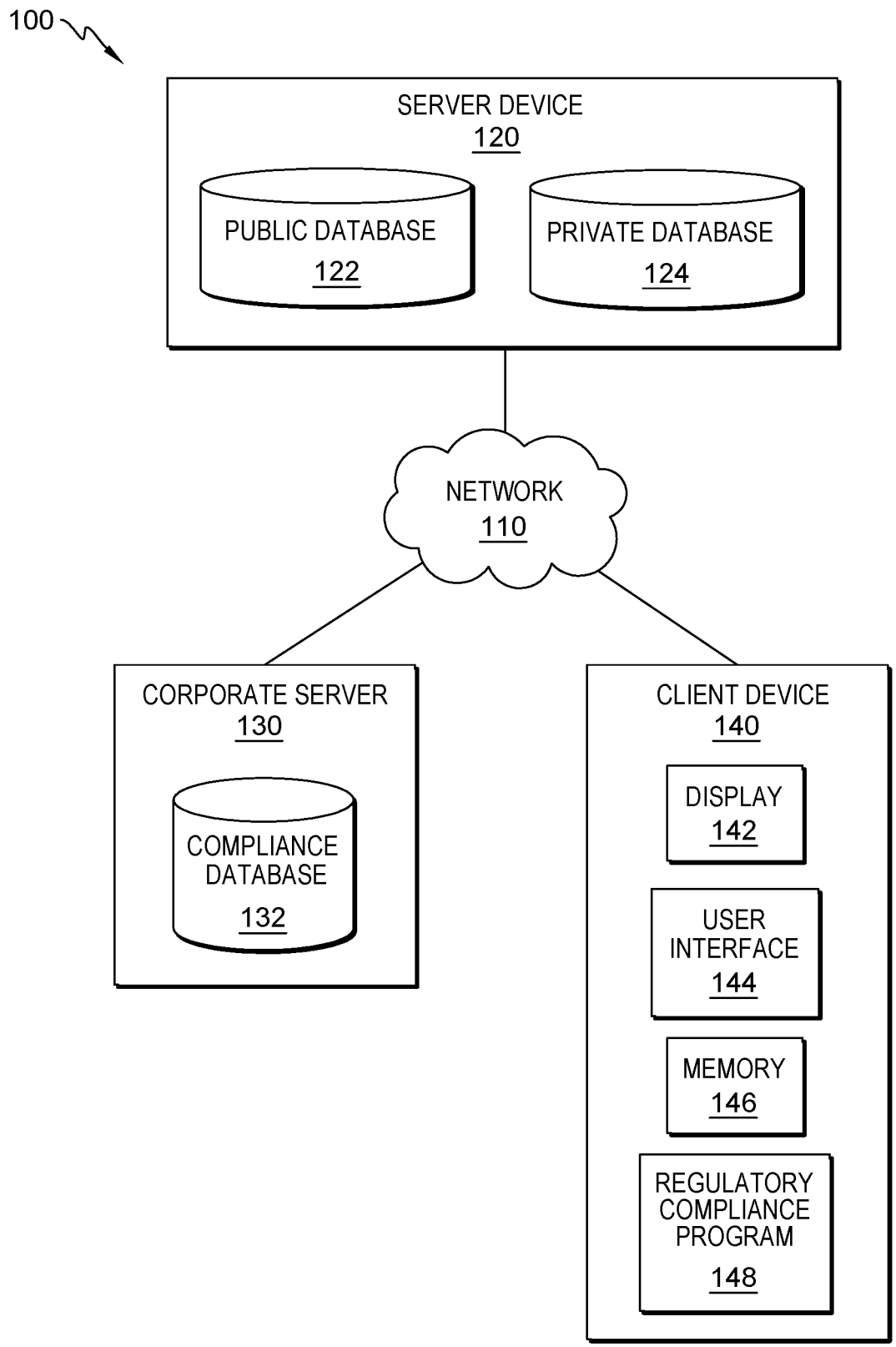
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes server device 120, corporate server 130, and client device 140, interconnected by network 110. In example embodiments, computing environment 100 includes other computing devices (not shown in FIG. 1) such as smartwatches, cell phones, smartphones, wearable technology, phablets, tablet computers, additional laptop computers, additional desktop computers, other computer servers, or any other computer system known in the art, interconnected with server device 120, corporate server 130, and client device 140 over network 110

In embodiments of the present invention, server device 120, corporate server 130, and client device 140 are connected to network 110, which enables server device 120, corporate server 130, and client device 140 to access other computing devices and/or data not directly stored on server device 120, corporate server 130, and client device 140. Network 110 may be, for example, a short-range, low power wireless connection, a local area network (LAN), a telecommunications network, a wide area network (WAN) such as the Internet, or any combination of the four, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between server device 120, corporate server 130, and client device 140, and any other computing devices (not shown in FIG. 1) connected to network 110, in accordance with embodiments of the present invention. In an embodiment, data received by another computing device (not shown in FIG. 1) in computing environment 100 is communicated to server device 120, corporate server 130, and client device 140 via network 110.

In an embodiment, server device 120 is one of a laptop, tablet, or netbook personal computer (PC), a desktop computer, a server, a personal digital assistant (PDA), a smartphone, a standard cell phone, a smartwatch or any other wearable technology, or any other hand-held, programmable electronic device capable of communicating with any other computing device within computing environment 100. According to embodiments, server device 120 can be a standalone computing device, a management server, a web server, a mobile computing device, or any other electronic device or computing system capable of receiving, transmitting, and processing data. In other embodiments, server device 120 can represent computing systems utilizing multiple computers as a server system, such as in a cloud computing environment. In certain embodiments, server device 120 represents a computer system utilizing clustered computers and components (e.g., database server computers, application server computers, etc.) that act as a single pool of seamless resources when accessed by elements of computing environment 100. In general, server device 120 is representative of any electronic device or combination of electronic devices capable of executing computer readable program instructions. In an embodiment, computing environment 100 includes any number of server device 120. Server device 120 may include internal and external hardware components as depicted and described in further detail with respect to FIG. 4, in accordance with embodiments of the present invention. In an embodiment, server device 120 includes public database 122 and private database 124. In another embodiment, public database 122 and private database 124 are in different, rather than the same, server device.

According to an embodiment, public database 122 is a collection of information that is organized in a memory so that it can be easily accessed, managed, and updated. Public database 122 contains an aggregation of public data records or files, containing information about one or more corporations conducting business, said one or more corporations having to be in compliance with any number of regulations. In an embodiment, public database 122 may be a relational database or a graph database. According to one embodiment of the present invention, there can be any number of public database 122 in computing environment 100.

In an embodiment, private database 124 is a collection of information that is organized in a memory so that it can be easily accessed, managed, and updated. Private database 124 contains an aggregation of proprietary data records or files not yet disclosed to the general public but available to specific entities by, for example, subscription or by authorized access from the owner of the proprietary data. According to an embodiment, the proprietary data records contain information about one or more corporations conducting business, said one or more corporations having to be in compliance with any number of regulations. In an embodiment, private database 124 may be a relational database or a graph database. According to one embodiment of the present invention, there can be any number of private database 124 in computing environment 100.

According to an embodiment, corporate server 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, corporate server 130 can be a standalone computing device, a management server, a web server, a mobile computing device, or any other electronic device or computing system capable of receiving, transmitting, and processing data. In other embodiments, corporate server 130 can represent computing systems utilizing multiple computers as a server system, such as in a cloud computing environment. In certain embodiments, corporate server 130 represents a computer system utilizing clustered computers and components (e.g., database server computers, application server computers, etc.) that act as a single pool of seamless resources when accessed by elements of computing environment 100. In general, corporate server 130 is representative of any electronic device or combination of electronic devices capable of executing computer readable program instructions. In an embodiment, computing environment 100 includes any number of corporate server 130. Corporate server 130 may include internal and external hardware components as depicted and described in further detail with respect to FIG. 4, in accordance with embodiments of the present invention. In an embodiment, corporate server 130 is substantially similar to server device 120. According to an embodiment of the present invention, corporate server 130 includes compliance database 132.

According to embodiments of the present invention, compliance database 132 is a collection of information that is organized in a memory so that it can be easily accessed, managed, and updated. Compliance database 132 contains an aggregation of compliance data records or files, containing information about the regulatory compliance data for a corporation conducting business, said corporation having to be in compliance with any number of regulations. In an embodiment, compliance database 132 may be a relational database or a graph database. According to one embodiment of the present invention, there can be any number of compliance database 132 in computing environment 100.

In an embodiment, client device 140 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client device 140 can be a standalone computing device, a management server, a web server, a mobile computing device, or any other electronic device or computing system capable of receiving, transmitting, and processing data. In other embodiments, client device 140 can represent computing systems utilizing multiple computers as a server system, such as in a cloud computing environment. In certain embodiments, client device 140 represents a computer system utilizing clustered computers and components (e.g., database server computers, application server computers, etc.) that act as a single pool of seamless resources when accessed by elements of computing environment 100. In general, client device 140 is representative of any electronic device or combination of electronic devices capable of executing computer readable program instructions. In an embodiment, computing environment 100 includes any number of client device 140. Client device 140 may include internal and external hardware components as depicted and described in further detail with respect to FIG. 4, in accordance with embodiments of the present invention. According to an embodiment of the present invention, client device 140 includes display 142, user interface 144, memory 146, and regulatory compliance program 148.

According to an embodiment, display 142 is an electronic visual device for a desktop computer, laptop computer, tablet computer, smartphone, smart-watch, and the like. Display 142 may include a touchscreen which is an input device layered on top of the display for allowing a user to control an electronic device via simple or multi-touch gestures by touching display 142 with a special stylus and/or one or more fingers. Display 142 displays open programs and applications, allowing a user of client device 140 to interact with the open programs and applications via a keyboard, mouse, and buttons (not shown in FIG. 1). Display 142 may be a thin film transistor liquid crystal display (TFT-LCD), a flat panel LED (light emitting diode) display, a cathode ray tube (CRT), or any type of display device known in the art or developed in the future. Display 142 may be connected to server device 120 via VGA (video graphics array), DVI (digital video interface), HDMI (High Definition MultiMedia Interface), or any other connection type known in the art or developed in the future.

In an embodiment, user interface 144 provides an interface between a user of client device 140 and regulatory compliance program 148. User interface 144 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 144 may also be mobile application software that provides an interface between client device 140 and regulatory compliance program 148. Mobile application software, or an "app," is a computer program designed to nut on smartphones, tablet computers and other mobile devices. User interface 144 enables a user of client device 140 to interact with regulatory compliance program 148, corporate server 130, server device 120, and any other computing devices not shown in FIG. 1.

According to an embodiment, memory 146 is storage that is written to and/or read by regulatory compliance program 148, and any other programs and applications on client device 140. In one embodiment, memory 146 resides on client device 140. In other embodiments, memory 146 resides on server device 120, corporate server 130, or on any other device (not shown) in computing environment 100, in cloud storage, or on another computing device accessible via network 110. In yet another embodiment, memory 146 represents multiple storage devices within client device 140. Memory 146 may be implemented using any volatile or non-volatile storage media for storing information, as known in the art. For example, memory 146 may be implemented with a tape library, optical library, one or more independent hard disk drives, multiple hard disk drives in a redundant array of independent disks (RAID), solid-state drives (SSD), or random-access memory (RAM). Similarly, memory 146 may be implemented with any suitable storage architecture known in the art, such as a relational database, an object-oriented database, or one or more tables. In an embodiment of the present invention, regulatory compliance program 148, and any other programs and applications (not shown in FIG. 1) operating on client device 140, corporate server 130, and server device 120 may store, read, modify, or write data to memory 146. In an embodiment of the present invention, data stored to memory 146 includes, but is not limited to, data stored by regulatory compliance program 148 such as a corporate regulatory profile for a corporation.

According to embodiments of the present invention, regulatory compliance program 148 can be a program, a subprogram of a larger program, an application, a plurality of applications, or mobile application software, which functions to provide for the remediation of regulatory non-compliance. A program is a sequence of instructions written to perform a specific task. In an embodiment, regulatory compliance program 148 runs by itself. In other embodiments, regulatory compliance program 148 depends on system software (not shown in FIG. 1) to execute. According to an embodiment, regulatory compliance program 148 is a cognitive system based on artificial intelligence utilizing machine learning and deep learning that identifies and corrects regulatory non-compliance of devices. In one embodiment, regulatory compliance program 148 functions as a stand-alone program residing on client device 140. In another embodiment, regulatory compliance program 148 works in conjunction with other programs, applications, etc., found in computing environment 100. In yet another embodiment, regulatory compliance program 148 resides on any computing device within computing environment 100, for example, server device 120 and corporate server 130. In yet another embodiment, regulatory compliance program 148 resides on other computing devices (not shown in FIG. 1) in computing environment 100, which are interconnected to client device 140 via network 110.

According to an embodiment, regulatory compliance program 148 receives configuration data from a user for an entity (e.g., a corporation, a school district, a university system, a governmental agency, etc.). In the embodiment, regulatory compliance program 148 retrieves public and private data associated with the entity. Further in the embodiment, regulatory compliance program 148 determines regulations applicable to the entity based on the configuration data and the retrieved data. Further yet in the embodiment, regulatory compliance program 148 creates a profile defining the regulations the entity must follow. Further yet in the embodiment, regulatory compliance program 148 stores the profile and the associated data. Further yet in the embodiment, regulatory compliance program 148 determines site regulations for at least one operating site of the entity. Further yet in the embodiment, regulatory compliance program 148 stores the site information. Further yet in the embodiment, regulatory compliance program 148 analyzes the hardware and software running at the at least one operating site. Further yet in the embodiment, based on the hardware and software analysis, regulatory compliance program 148 determines whether the hardware and software is in compliance with the determined regulations. Further yet in the embodiment, responsive to determining that the hardware and/or software is not in compliance, regulatory compliance program 148 executes one or more scripts to cause the hardware and/or software to become compliant with the regulations.

Figure 2:
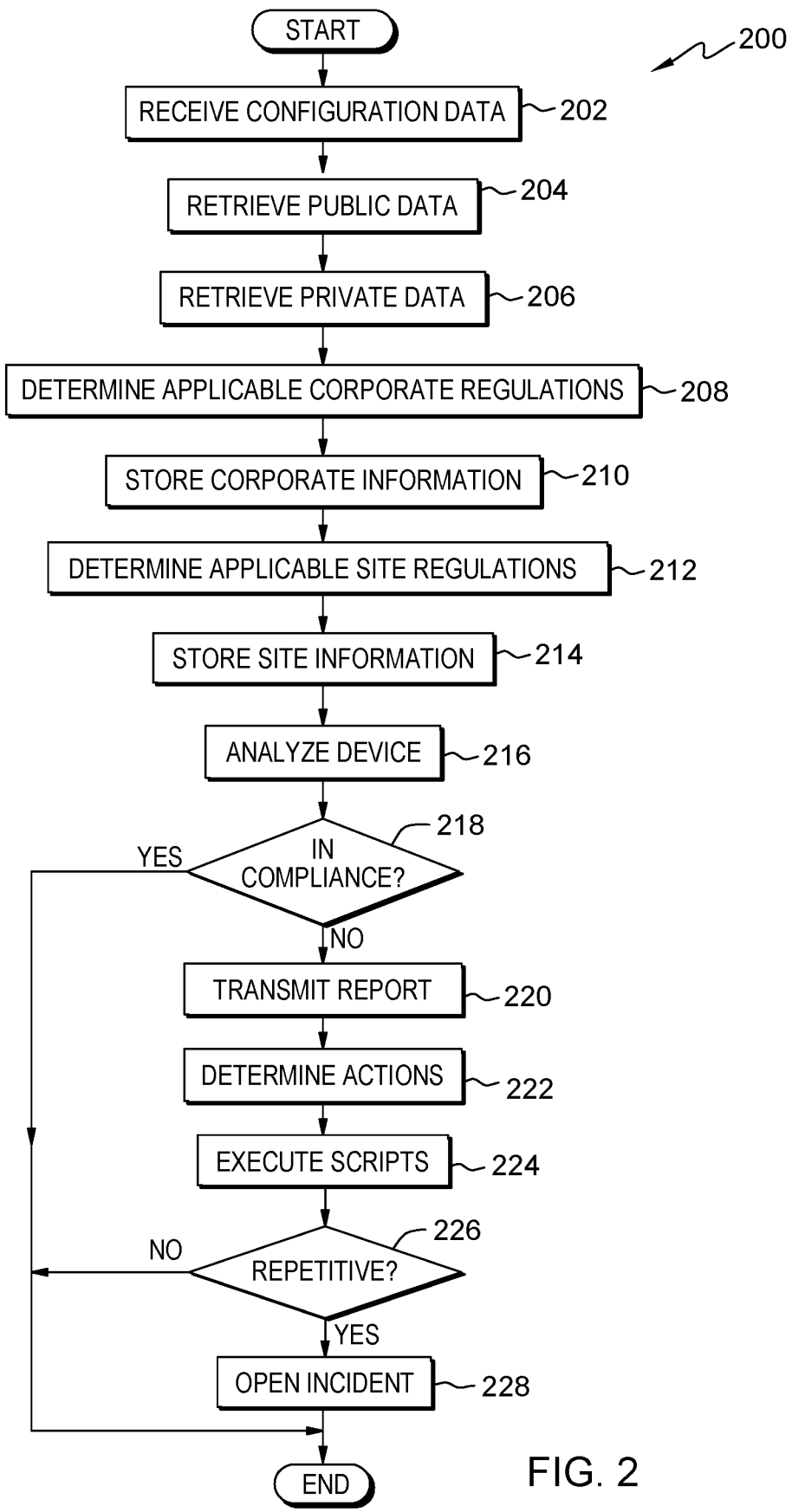
FIG. 2 depicts a flowchart of a program providing for the remediation of regulatory non-compliance, in accordance with an embodiment of the present invention.

FIG. 2 is a flowchart of workflow 200 depicting a method for providing for the remediation of regulatory non-compliance. In one embodiment, the method of workflow 200 is performed by regulatory compliance program 148. In an alternative embodiment, the method of workflow 200 is performed by any other program working with regulatory compliance program 148. In an embodiment, a user of client device 140 invokes workflow 200 upon loading configuration data about a corporation into regulatory compliance program 148. In an alternative embodiment, a user of client device 140 invokes workflow 200 upon accessing compliance database 132 on corporate server 130.

In an embodiment, regulatory compliance program 148 receives configuration data (step 202). In other words, regulatory compliance program 148 receives, from a user, configuration data for one or more entities that the user is monitoring for regulatory compliance. Note that for purposes of an example, a corporation (i.e., business) will be used as the referenced entity throughout this paper. According to an embodiment, a corporation of the one or more corporations may include a corporation where the user is employed. According to another embodiment, a corporation of the one or more corporations may include a corporation to be audited for compliance by the user. In an embodiment, configuration data for a corporation includes, but is not limited to, a corporation name, one or more lines of business in which the corporation does business, a location of the corporation headquarters, one or more site locations where the corporation does business, information associated with the one or more site locations, a stock symbol of the corporation, and the like. According to an embodiment, regulatory compliance program 148 receives configuration data for a corporation from a user via user interface 144 on client device 140. In the embodiment, the configuration data is stored by regulatory compliance program 148 to memory 146 on client device 140. For example, Tom, an employee of "Company X", enters configuration data associated with "Company X" into a program on a laptop computer. The data entry by Tom is in preparation for a regulatory compliance audit of "Company X" that Tom performs annually.

According to an embodiment of the present invention, regulatory compliance program 148 retrieves public data (step 204). In other words, responsive to receiving configuration data for a corporation, regulatory compliance program 148 retrieves public data associated with the corporation and the one or more sites where the corporation conducts business. In an embodiment, regulatory compliance program 148 searches publicly available records such as the annual report for the corporation, a public website (if available) of the corporation, any number of news organizations for news related to the corporation (e.g., the corporation has signed a large deal to be a supplier for another corporation), public social media sites for information associated with the corporation, and any other publicly available sources. In the embodiment, information retrieved by regulatory compliance program 148 includes, but is not limited to, site locations where the corporation operates, corporation records made public by the corporation, public financial statements, lines of business for the corporation, and the like. According to an embodiment, regulatory compliance program 148 retrieves public data about the corporation by searching and retrieving via network 110, public data from public database 122 on server device 120 and compliance database 132 on corporate server 130; the retrieved public data is stored by regulatory compliance program 148 to memory 146 on client device 140. For example, the program that received the configuration data from Tom searches the Internet for information about "Company X" on publicly available websites (e.g., news sites, social media, etc.). The program stores the information to a local memory on the laptop.

In an embodiment, regulatory compliance program 148 retrieves private data (step 206). In other words, regulatory compliance program 148 retrieves information about the corporation, and the one or more sites where the corporation conducts business, from proprietary records to which regulatory compliance program 148 has access (e.g., by subscription), said proprietary records not available to the general public. According to an embodiment, private information includes, but is not limited to, financial forecast data, predictions regarding products the corporation might begin producing, predictions about products the company might stop producing, and the like. In an embodiment, regulatory compliance program 148 retrieves private data about the corporation by searching and retrieving via network 110, private data from private database 124 on server device 120; the retrieved private is stored by regulatory compliance program 148 to memory 146 on client device 140. For example, the program on the laptop computer used by Tom searches subscription services and other sources on the Internet for information about "Company X". The program stores the information to a local memory on the laptop.

According to an embodiment of the present invention, regulatory compliance program 148 determines applicable corporate regulations (step 208). In other words, regulatory compliance program 148, based on the received configuration data and the retrieved public and private data, determines the regulations applicable to the corporation, and thus, also creates a corporate profile. In an instance where more than one regulation concerning the same topic applies to the corporation, the more stringent regulation takes precedence over the others. For example, if a State regulation concerning password lengths requires passwords be at least six characters long and the corporation requires passwords to be at least eight characters long, the regulation to be enforced is the corporation regulation that a password must be eight or more characters in length. According to an embodiment, regulatory compliance program 148 utilizes machine learning (ML), natural language processing (NLP), and natural language classification (NLC), amongst other technologies known in the art, to analyze the content. In the embodiment, ML is the scientific study of algorithms and statistical models that computer systems use to perform a specific task without using explicit instructions, relying on patterns and inference instead. ML algorithms build a mathematical model based on sample data, known as "training data", in order to make predictions or decisions without being explicitly programmed to perform the task. ML is seen as a subset of artificial intelligence (AI). Further in the embodiment, NLP is a subfield of linguistics, computer science, information engineering, and artificial intelligence concerned with the interactions between computers and human (natural) languages, in particular how to program computers to process and analyze large amounts of natural language data. Further yet in the embodiment, NLC classifies text into custom categories using cognitive computing techniques. Text classification, as performed by NLC, is foundational for NLP and ML and is useful for differentiating known words from strings of characters. In an embodiment, regulatory compliance program 148 determines the regulations and the associated corporate profile applicable to the corporation based on analyzing the configuration data, private data, and public data previously stored to memory 146 on client device 140 via ML, NLP, and NLC. For example, the program on the laptop computer used by Tom in the audit uses the stored data to determine what regulations apply to "Company X".

According to some embodiments, regulatory compliance program 148 stores corporate information (step 210). In other words, regulatory compliance program 148 stores the received configuration data, the retrieved public data, the retrieved private data, the determined regulations applicable to the corporation, and the corporate profile (and the associated query data for each regulation) to a memory. In an embodiment, regulatory compliance program 148 stores the corporate information to memory 146 on client device 140. For example, the program stores the information, including the company profile, associated with "Company X".

In an embodiment, regulatory compliance program 148 creates a regulatory profile for the corporation by analyzing each applicable regulation determined from the configuration, public, and private data (as described above). According to embodiments of the present invention, regulatory compliance program 148 performs the analysis by determining the response to each of three queries for each applicable regulation. In the embodiment, the first query regulatory compliance program 148 poses for a first regulation is "who must comply with the regulation?". Here, for example, the response can be one of: (i) the corporation headquarters only; (ii) each individual site location where the corporation operates; (iii) only specific locations where the corporation operates, and (iv) any combination of the headquarters and the individual sites. Further in the embodiment, the second query regulatory compliance program 148 poses for the first regulation is "when must they comply (i.e., what date each individual site must comply with each regulation)?". Here, for example, the response can be one of: (i) immediately; and (ii) on a specific, future date. Further yet in the embodiment, the third query regulatory compliance program 148 poses for the first regulation is "does the current regulation dictate any other regulations that must be complied with that have not yet been identified?". Here, for example, the response can be one of: (i) there are no other regulations driven by the current regulation; and (ii) yes, these "n" regulations must also be complied with, where "n" is any whole number greater than one. Further, regulatory compliance program 148 identifies the specific "n" regulations. Further yet in the embodiment, when the first regulation is complete, regulatory compliance program 148 repeats the process for the next regulation to which the corporation must comply. The process is further repeated until the entire set of the determined regulations have been addressed in the above described manner According to an embodiment of the present invention, regulatory compliance program 148 creates a corporate profile by analyzing data stored to memory 146 on client device 140 via the described queries. For example, the program on the laptop used by Tom creates a company profile for "Company X".

According to an embodiment of the present invention, regulatory compliance program 148 determines applicable site regulations (step 212). In other words, regulatory compliance program 148 receives configuration data about, and retrieves public and private data for, each site location where the corporation conducts business (as discussed above in reference to the corporation) and thereby, creates a site profile. In an embodiment, a user may supply configuration data associated with a site to regulatory compliance program 148. Further in the embodiment, regulatory compliance program 148 retrieves public data associated with the site from sources associated with the site such as a local newspaper and local television and radio station websites. Further yet in the embodiment, regulatory compliance program 148 retrieves private data about the site from subscription services not available to the general public. From the configuration data and the public/private data, regulatory compliance program 148 determines which regulations of the applicable corporate regulations previously determined must be complied with by the site and further creates a site profile. In an instance where more than one regulation concerning the same topic applies to the corporate site, the more stringent regulation takes precedence over the others. For example, if a Federal regulation concerning the installation of security patches requires said patches be installed within seven days and the site regulation requires the patches to be installed within twenty-four hours, the site regulation of a twenty-four hour installation takes precedence. According to an embodiment, regulatory compliance program 148 determines the applicable site regulations and creates the site profile based on analyzing the configuration data, private data, and public data stored to memory 146 on client device 140 via ML, NLP, and NLC. For example, the program on the laptop computer used by Tom in the audit uses the stored data to determine what regulations apply to the "Company X" site located in the state of Michigan.

In an embodiment, regulatory compliance program 148 stores site information (step 214). In other words, regulatory compliance program 148 stores (i) the received configuration data; (ii) the retrieved public data; (iii) the retrieved private data; (iv) the determined regulations applicable to the site; (v) the created site profile; and (vi) the sensitive data, if identified, that the site processes and stores, to a memory. In an embodiment, regulatory compliance program 148 stores the site level information to memory 146 on client device 140. For example, the program stores the information associated with the Michigan location of "Company X".

In embodiments of the invention, regulatory compliance program 148 creates a regulatory profile for each site where the corporation conducts business by analyzing each applicable regulation determined from the configuration, public, and private data (as previously described above). According to an embodiment, from the plurality of received configuration data, the plurality of retrieved public and private data, and the site profile, regulatory compliance program 148 further determines what, if any, sensitive data (e.g., personal, corporate, trade secrets, etc.) the site processes and stores. Further in the embodiment, regulatory compliance program 148 determines the relevance of each regulation identified for the corporation (as discussed above) for each site where the corporation operates. Further yet in the embodiment, a query is posed by regulatory compliance program 148 for each corporate site. In the embodiment, the query regulatory compliance program 148 poses is "must this site comply with this first regulation?". Here, for example, the response is one of (i) yes; and (ii) no. The process is repeated until the entire set of the identified regulations have been addressed via the query. Based on the totality of the responses, regulatory compliance program 148 updates the regulatory profile for each site by identifying the specific regulations that must be complied with by the site. According to an embodiment, the specific regulations include either (i) all of the corporate regulations or (ii) a subset of the corporate regulations. In an embodiment, regulatory compliance program 148 creates a site regulatory profile for each site operated by the corporation by analyzing the data stored to memory 146 on client device 140. For example, a site regulatory profile for the "Company X" site located in Michigan is created by the program on the laptop used by Tom.

According to an embodiment of the present invention, regulatory compliance program 148 analyzes devices (step 216). In other words, regulatory compliance program 148 performs an analysis of each device on the site to determine whether the hardware and software of each device is in compliance with each regulation as defined by the site regulatory profile. In an embodiment, regulatory compliance program 148 transmits (i.e., "pushes") a set of commands to each device at the site to collect data associated with regulatory compliance about each device. In the embodiment, the set of commands are executed at the operating system (OS) level. Further in the embodiment, each device executes the set of commands, and regulatory compliance program 148 collects and stores the results of the executed commands. Further yet in the embodiment, regulatory compliance program 148 compares the stored results from the executed set of commands to the regulations (i.e., requirements) in the site regulatory profile to determine which regulations are complied with and which are not. According to an embodiment of the present invention, regulatory compliance program 148 analyzes corporate server 130 by transmitting a set of OS level commands over network 110 to corporate server 130 for execution; regulatory compliance program 148 subsequently collects the results and determines the regulatory compliance of corporate server 130. For example, the program on the laptop Tom is using for the audit transmits a set of commands to each device at the Michigan site of "Company X"; the program then collects the results and determines the compliance of each device.

In an embodiment, regulatory compliance program 148 determines whether the device is in compliance (decision step 218). In other words, based on the hardware and software analysis of the device, regulatory compliance program 148 determines the compliance of the device by comparing the results of the analysis to the regulation requirements as determined in the site regulatory profile. According to an embodiment of the invention, regulatory compliance program 148 (i) identifies a first regulation in the site regulatory profile, (ii) determines the requirements per the regulation, (iii) retrieves the result of the device analysis for the first regulation, and (iv) compares the requirement to the result to determine compliance of the device for the first regulation. In one embodiment (decision step 218, YES branch), regulatory compliance program 148 determines that the device is in regulatory compliance with a first regulation; therefore, regulatory compliance program 148 either checks the status for a second regulation or ends. In the embodiment (decision step 218, NO branch), regulatory compliance program 148 determines that the device is not in regulatory compliance with the first regulation; therefore, regulatory compliance program 148 proceeds to step 220 to transmit a report.

A first example of a compliance regulation is the level of an OS. Consider that for security reasons, a particular regulation requires companies that store personal, sensitive information of employees use an OS at level "4" or higher. When regulatory compliance program 148 transmits the set of commands, if a result from a company device indicates that the device is using level "3" OS (a down-level version from "4"), that device, and therefore, the company site and the corporation, is not complying with the regulation, then regulatory compliance program 148 transmits a report concerning the non-compliance A second example of a compliance regulation is the number of logon attempts to a secure application. Consider again that, for security reasons, a user is limited to a maximum of "3" logon attempts to a secure application. If the user is unable to logon within the three attempts, the user is required to wait for one hour before trying again. When regulatory compliance program 148 transmits the set of commands, if a result from a company device indicates that the device limits the user to "2" logon attempts before locking out the user for one hour, then regulatory compliance program 148 determines that the device is in compliance with the regulation and regulatory compliance program 148 determines compliance for a next regulation or ends of there are no additional regulations to check for the device. It should be noted that other devices at the site may or may not be in compliance with the regulation pending the determination for each individual device at the site for each regulation.

According to an embodiment, regulatory compliance program 148 transmits a report (step 220). In other words, responsive to determining that a computing device is not in compliance with a regulation as dictated in the site regulatory profile, regulatory compliance program 148 transmits a report to (i) one or more users, (ii) one or more systems, or (iii) both one or more users and systems concerning the non-compliance issue. In an embodiment, the transmitted report includes, but is not limited to, at least one regulation causing the non-compliance issue, the current state of the computing device associated with the regulation, the required state for the computing device to be in compliance, and the date and time of the non-compliance issue of the computing device. In the embodiment, the transmitted report is in any form known in the art (e.g., an e-mail, a text message, an audio file, a log file, a system message, etc.). According to an embodiment, regulatory compliance program 148 transmits a report to a user of client device 140 indicating that corporate server 130 is not compliant with a required regulation per the site regulatory profile. For example, Tom receives a pop-up message on the laptop computer indicating that software for a server at the Michigan "Company X" location is not up-to-date and at the required level per the regulatory profile created for said Michigan location.

In an embodiment, regulatory compliance program 148 determines actions (step 222). In other words, responsive to determining that a device is not in compliance with the required regulations per the site regulatory profile, regulatory compliance program 148 determines one or more remediation actions, based on the determined regulatory non-compliance issues, that will bring the device into compliance. In an embodiment, a first remediation action is to determine one or more scripts to execute on the non-compliant device. In another embodiment, a second remediation action is to include an instruction in the transmitted report (previously discussed above) to the device owner to resolve the non-compliance issue. According to an embodiment, for each regulation a device is not compliant with, regulatory compliance program 148 determines the differences between said regulation and the current device state. Based on the determined differences, regulatory compliance program 148 determines a one or more scripts to execute on the non-compliant device which will resolve the non-compliance issues with the regulation. Each non-compliant element will have an associated corrective action (i.e., script) to be executed. In an embodiment, regulatory compliance program 148 determines one or more scripts to transmit to each non-compliant device for execution on said device by regulatory compliance program 148 to resolve one or more identified non-compliance issues. For example, the program on the laptop computer used by Tom determines an appropriate script to execute on the server at the Michigan location which will bring the software up to the appropriate level per the regulation.

In an embodiment, regulatory compliance program 148 executes scripts (step 224). In other words, regulatory compliance program 148 executes one or more scripts to cause the non-compliant device to become compliant with the required regulations. According to a first embodiment, regulatory compliance program 148 (i) transmits the determined one or more scripts to the identified device and (ii) automatically executes said one or more scripts on said device to cause the device to become compliant with the identified regulations. According to a second embodiment, regulatory compliance program 148 (i) transmits the determined one or more scripts to the identified device and (ii) instructs the device OS to execute the transmitted one or more scripts to cause the device to become compliant. According to a third embodiment, regulatory compliance program 148 (i) transmits the determined one or more scripts to the identified device and (ii) a notification is generated and transmitted to an owner of the non-compliant device identifying the non-compliant issue to said owner indicating what change is required to resolve the issue. In an embodiment, regulatory compliance program 148 transmits the determined one or more scripts over network 110 to corporate server 130 and executes the transmitted scripts on corporate server 130 which brings corporate server 130 into regulatory compliance. For example, the program on the laptop computer used by Tom in the audit transmits the previously determined script to the server at the Michigan location of "Company X" and subsequently executes said script resulting in a software upgrade of the server software which resolves the previously identified non-compliance issue.

According to embodiments of the present invention, regulatory compliance program 148 determines whether a compliance violation is repetitive (decision step 226). In other words, responsive to determining a non-compliance issue for a device, regulatory compliance program 148 determines whether said issue is a repetitive violation of the regulation (i.e., occurs more than a threshold number of times within a predetermined time period; e.g., occurs three times within a one year period of time). In an embodiment, regulatory compliance program 148 checks a compliance history for the device to determine whether the same issue has previously occurred. In the embodiment, regulatory compliance program 148 checks the compliance history of the device in an available memory, such as compliance database 132 on corporate server 130 or memory 146 on client device 140. According to one embodiment (decision step 226, NO branch), regulatory compliance program 148 determines that an identified compliance violation is not repetitive; therefore, regulatory compliance program 148 either checks a next compliance violation to determine if said next violation is repetitive or regulatory compliance program 148 ends. According to the embodiment (decision step 226, YES branch), regulatory compliance program 148 determines that an identified compliance violation is repetitive; therefore, regulatory compliance program 148 proceeds to step 228 to open an incident.

In an embodiment, regulatory compliance program 148 opens an incident (step 228). In other words, responsive to determining that a compliance violation is repetitive on a device, regulatory compliance program 148 opens a security incident associated with the repetitive compliance violation and said device. According to one embodiment of the present invention, regulatory compliance program 148 accesses a security reporting tool associated with said device and opens a security incident indicating that potential malicious activity is occurring on said device based on the repetitive regulatory compliance violation identified by regulatory compliance program 148. According to the one embodiment, part of the security incident process is an immediate notification to the stakeholders associated with said device about the possible malicious activity. According to another embodiment, regulatory compliance program 148 includes a security incident tool (not shown in FIG. 1) and upon determining that a compliance violation is repetitive, regulatory compliance program 148 opens a security incident via its internal tool to report the potential malicious activity associated with said device. In an embodiment, regulatory compliance program 148 accesses a security reporting tool associated with corporate server 130 to report a repetitive compliance violation occurring on corporate server 130. For example, the program on the laptop computer access a security reporting tool used by the Michigan site of "Company X" to open a security incident identifying possible malicious activity on the Michigan site server due to the repetitive issue of the server software being down-level from the current version of the software.

FIG. 3A depicts table 300, a set of exemplary examples of operating system (OS) commands or scripts according to one embodiment of the present invention. It should be understood that the scripts provided are example scripts applicable to one platform. Other scripts for other platforms, while not depicted in table 300, are known in the art and can be properly executed by regulatory compliance program 148 as needed. In the embodiment, responsive to determining that a device is not in regulatory compliance, one or more of the scripts are executed by regulatory compliance program 148 on the non-compliant device to resolve the compliance issue. The OS commands in table 300 are not meant to be exhaustive but are provided as some examples of scripts that can be executed by regulatory compliance program 148.

FIG. 3B depicts table 350, a subset of the OS commands provided in table 300, and for said subset of OS commands, their associated functions that are performed when executed by regulatory compliance program 148. Consider the following example script—"cat/etc/security/passwd>aisec_passi.log;", as defined in the system configuration. The script will read the password file on an Advanced Interactive eXecutive (AiX) operating system and write certain information to the file "aisec_passi.log"; the information includes 'name' (i.e., a user name of a user); 'password' (i.e., password validation for the user with the actual password information being stored in a separate 'shadow' password file); 'user ID' (i.e., a user identifier number); 'group ID' (i.e., a group identifier number); 'gecos' (i.e., a text description of the user); 'home directory' (i.e., a path to the home directory of the user); and 'shell' (i.e., a system command line interpreter). Thus, an example record for "Joe Smith" stored to the "aisecpassilog" file is "jsmith:x:1001:1000:Joe Smith, Room 1007,(234)555-8910,email:/home/jsmith:/bin/sh". Based on the information collected by the above script, regulatory compliance program 148 is able to determine whether password related requirements included in a regulation are being followed (i.e., comply). For example, does the password of the user meet the complexity requirements (i.e., the number of characters, the types of characters, etc.) stated in the regulation (e.g., a password must be at least eight characters in length and include upper and lower case letters, at least one number, and at least one special character such as "#", "$", "%", "*", and the like)? If the password requirement is not being met, regulatory compliance program 148 (i.e., the cognitive system) notifies the device user and suggests an appropriate password. In response to the user accepting the password, the cognitive system changes the password of the user to the suggested password.

Figure 4:
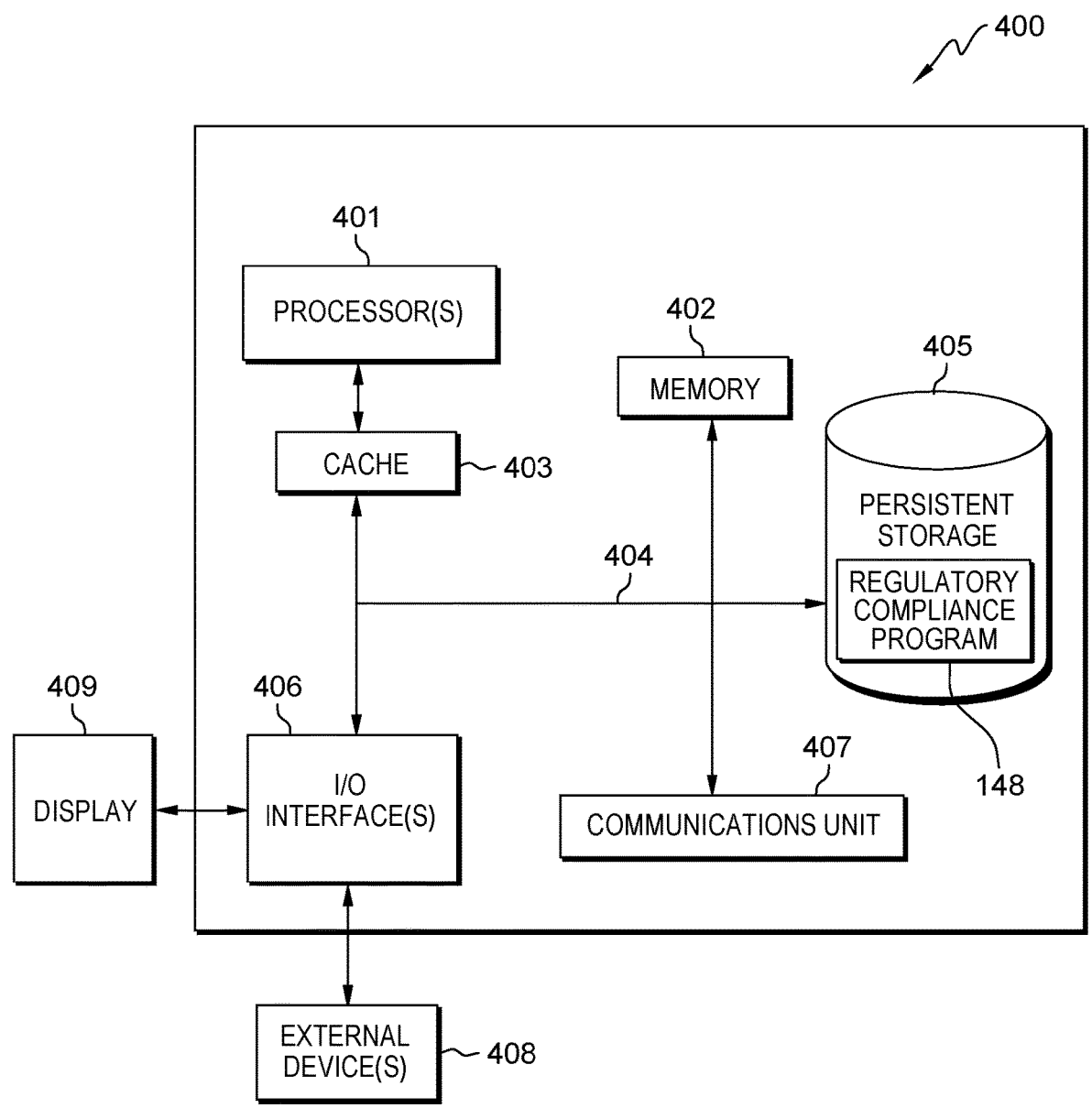
FIG. 4 depicts a block diagram of components of the computing environment of FIG. 1, in accordance with an embodiment of the present invention.

FIG. 4 depicts computer system 400, which is an example of a system that includes regulatory compliance program 148. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, comprising:
   analyzing, by one or more computer processors, content of a regulation to determine whether the regulation is applicable to a computing device of an entity based on a response to queries including who complies with the regulation and when compliance with the regulation must occur;
   determining, by the one or more computer processors, the regulation of the regulatory profile takes precedence over other regulations of the regulatory profile applicable to the computing device;
   analyzing, by the one or more computer processors, the computing device based on the determined regulation of a regulatory profile and on regulatory compliance for the entity associated with the computing device;
   determining, by the one or more computer processors, whether the computing device includes at least one regulatory non-compliance issue; and
   responsive to determining that the computing device includes at least one regulatory non-compliance issue, executing, by the one or more computer processors, at least one script on the computing device to cause the computing device to resolve the at least one regulatory non-compliance issue based on the determined regulation of the regulatory profile,
   wherein the at least one script on the computing device causes a software upgrade of a server software of the computing device.

2. The method of claim 1, further comprising:
   responsive to determining that the computing device includes at least one regulatory non-compliance issue, transmitting, by the one or more computer processors, a report to at least one of a user and a system associated with the computing device;
   determining, by the one or more computer processors, one or more remediation actions required to resolve the non-compliance issue on the computing device, wherein the one or more remediation actions include the at least one script to be executed on the computing device to cause the computing device to resolve the at least one regulatory non-compliance issue;
   executing, by the one or more computer processors, the at least one script on the computing device;
   determining, by the one or more computer processor, whether the non-compliance issue is a repetitive issue occurring on the computing device; and
   responsive to determining that the non-compliance issue is a repetitive issue occurring on the computing device, opening, by the one or more computer processors, a security incident associated with the repetitive issue and the computing device, wherein the security incident includes at least an immediate notification to at least one stakeholder associated with the computing device concerning possible malicious activity occurring on the computing device.

3. The method of claim 2, wherein the repetitive issue is an issue that occurs more than a threshold number of time within a predetermined time period.

4. The method of claim 1, wherein the step of analyzing, by one or more computer processors, the computing device based on the regulatory profile and on regulatory compliance for the entity associated with the computing device, comprises:
   transmitting, by the one or more computer processor, a set of commands to a plurality of computing devices to collect regulatory compliance data associated with each computing device of the plurality of computing devices;
   executing, by the one or more computer processors, the set of commands at an operating system level of each computing device of the plurality of computing devices;
   collecting, by the one or more computer processors, a set of results associated with the executed set of commands;
   storing, by the one or more computer processors, the collected set of results; and
   comparing, by the one or more computer processors, the stored set of results to a set of regulations included in a site regulatory profile to determine a regulatory compliance of each computing device in the plurality of computing devices, wherein the analyzing of the computing device includes analyzing hardware and software of the computing device.

5. The method of claim 1, further comprising:
   determining, by the one or more computer processors, one or more regulations applicable to at least one entity, wherein the creating of the regulatory profile is based on analyzing the determined one or more regulations applicable to the at least one entity utilizing a natural language processing to analyze content of the one or more regulations;
   querying, by the one or more computer processors, the one or more regulations to determine compliance data;
   determining, by the one or more computer processors, the one or more regulations applicable to at least one computing device of a plurality of computing devices of the entity based on at least the regulatory profile; and
   creating, by the one or more computer processors, a respective regulatory profile associated with the computing device based on analyzing the determined one or more regulations applicable to the at least one computing device.

6. The method of claim 5, wherein the step of determining, by one or more computer processors, one or more regulations applicable to at least one entity, comprises:
   receiving, by the one or more computer processors, a set of configuration data associated with at least one entity;
   retrieving, by the one or more computer processors, a set of public data associated with the at least one entity from available public records associated with the at least one entity;
   retrieving, by the one or more computer processors, a set of private data associated with the at least one entity from available proprietary records associated with the at least one entity;
   analyzing, by the one or more computer processors, the received set of configuration data, the retrieved set of public data, and the retrieved set of private data; and
   determining, by the one or more computer processors, one or more regulations applicable to at least one entity based on the analyzed set of configuration data, the analyzed set of public data, and the analyzed set of private data.

7. The method of claim 5, wherein analyzing the determined one or more regulations applicable to the at least one entity, comprises:
   determining, by the one or more computer processors, which individual sites of a plurality of sites of the entity must comply with each regulation of the determined one or more regulations applicable to the entity;
   determining, by the one or more computer processors, what date each determined individual site must comply with each regulation of the determined one or more regulations; and
   determining, by the one or more computer processors, whether regulations in the determined one or more regulations applicable to the at least one entity dictate one or more other regulations not yet identified that are applicable to the at least one entity.

8. A computer program product, comprising:
   one or more computer readable storage media; and
   program instructions stored on the one or more computer readable storage media, the program instructions being executable by a computer processor to perform steps of the program instructions, the program instructions comprising:
   program instructions to analyze a regulation utilizing a natural language processing to determine whether the regulation is applicable to a computing device of an entity based on a response to queries including who complies with the regulation and when compliance with the regulation must occur;
   program instructions to determine the regulation of a regulatory profile takes precedence over other regulations of the regulatory profile applicable to the computing device;
   program instructions to analyze the computing device based on the determined regulation of the regulatory profile and on regulatory compliance for the entity associated with the computing device;
   program instructions to determine whether the computing device includes at least one regulatory non-compliance issue; and
   responsive to determining that the computing device includes at least one regulatory non-compliance issue, program instructions to determine at least one script to execute on the computing device to resolve the at least one regulatory non-compliance issue, and program instructions to execute the at least one script on the computing device to cause the computing device to resolve the at least one regulatory non-compliance issue based on the determined regulation of the regulatory profile by identifying specific regulations that must be complied with by the computing device,
   wherein the at least one script on the computing device causes a software upgrade of a server software of the computing device.

9. The computer program product of claim 8, further comprising program instructions stored on the one or more computer readable storage media, to:
   responsive to determining that the computing device includes at least one regulatory non-compliance issue, transmit a report to at least one of a user and a system associated with the computing device;
   determine one or more remediation actions required to resolve the non-compliance issue on the computing device, wherein the one or more remediation actions include the at least one script to be executed on the computing device;

transmit the at least one script to the computing device;
execute the at least one script on the computing device;
determine whether the non-compliance issue is a repetitive issue occurring on the computing device; and
responsive to determining that the non-compliance issue is a repetitive issue occurring on the computing device, open a security incident associated with the repetitive issue and the computing device, wherein the security incident includes at least an immediate notification to at least one stakeholder associated with the computing device concerning possible malicious activity occurring on the computing device.

10. The computer program product of claim 9, wherein the repetitive issue is an issue that occurs more than a threshold number of time within a predetermined time period.

11. The computer program product of claim 8, wherein the program instructions to analyze the computing device based on the regulatory profile and on regulatory compliance for the entity associated with the computing device, comprise:
   program instructions to transmit a set of commands to a plurality of computing devices to collect regulatory compliance data associated with each computing device of the plurality of computing devices;
   program instructions to execute the set of commands at an operating system level of each computing device of the plurality of computing devices;
   program instructions to collect a set of results associated with the executed set of commands;
   program instructions to store the collected set of results; and
   program instructions to compare the stored set of results to a set of regulations included in a site regulatory profile to determine a regulatory compliance of each computing device in the plurality of computing devices.

12. The computer program product of claim 8, further comprising program instructions stored on the one or more computer readable storage media, to:
   determine one or more regulations applicable to at least one entity, wherein the creation of the regulatory profile is based on analyzing the determined one or more regulations applicable to the at least one entity;
   query the one or more regulations to determine an individual that must comply, when the individual must comply, and associated unknown regulations;
   determine one or more regulations applicable to at least one computing device of a plurality of computing devices of the entity based on at least the regulatory profile and the query; and
   create a respective regulatory profile associated with the computing device based on analyzing the determined one or more regulations applicable to the at least one computing device utilizing the natural language processing to analyze content of the one or more regulations.

13. The computer program product of claim 12, wherein the program instructions to determine one or more regulations applicable to at least one entity, comprise:
   program instructions to receive a set of configuration data associated with at least one entity;
   program instructions to retrieve a set of public data associated with the at least one entity from available public records associated with the at least one entity;
   program instructions to retrieve a set of private data associated with the at least one entity from available proprietary records associated with the at least one entity;
   program instructions to analyze the received set of configuration data, the retrieved set of public data, and the retrieved set of private data; and
   program instructions to determine one or more regulations applicable to at least one entity based on the analyzed set of configuration data, the analyzed set of public data, and the analyzed set of private data.

14. The computer program product of claim 12, wherein analyzing the determined one or more regulations applicable to the at least one entity, comprises:
   determining, by one or more computer processors, which individual sites of a plurality of sites of the entity must comply with each regulation of the determined one or more regulations applicable to the entity;
   determining, by one or more computer processors, what date each determined individual site must comply with each regulation of the determined one or more regulations; and
   determining, by one or more computer processors, whether regulations in the determined one or more regulations applicable to the at least one entity dictate one or more other regulations not yet identified that are applicable to the at least one entity.

15. A computer system, the computer system comprising:
   one or more computer processors;
   one or more computer readable storage media; and
   program instructions stored on the one or more computer readable storage media for execution by at least one of the one or more computer processors, the program instructions comprising:
   program instructions to analyze a regulation utilizing a natural language processing to determine whether a regulation is applicable to a computing device of an entity based on a response to queries including who complies with the regulation and when compliance with the regulation must occur;
   program instructions to determine the regulation of a regulatory profile takes precedence over other regulations of the regulatory profile applicable to the computing device, the regulation being more stringent than the other regulations;
   program instructions to analyze the computing device based on the determined regulation of the regulatory profile and on regulatory compliance for the entity associated with the computing device, wherein the analyzing of the computing device includes program instructions to transmit a command for execution by the computing device and program instruction to determine compliance based on collected results of execution of the command;
   program instructions to determine whether the computing device includes at least one regulatory non-compliance issue; and
   responsive to determining that the computing device includes at least one regulatory non-compliance issue, program instructions to determine at least one script to execute on the computing device to resolve the at least one regulatory non-compliance issue, and program instructions to execute the at least one script on the computing device to cause the computing device to resolve the at least one regulatory non-compliance issue based on the determined regulation of the regulatory profile by identifying specific regulations that must be complied with by the computing device, wherein the at least one script on the computing device causes a software upgrade of a server software of the computing device.

16. The computer system of claim 15, further comprising program instructions stored on the one or more computer readable storage media for execution by at least one of the one or more computer processors, to:

responsive to determining that the computing device includes at least one regulatory non-compliance issue, transmit a report to at least one of a user and a system associated with the computing device;

determine one or more remediation actions required to resolve the non-compliance issue on the computing device, wherein the one or more remediation actions include the at least one script to be executed on the computing device;

transmit the at least one script to the computing device;

execute the at least one script on the computing device;

determine whether the non-compliance issue is a repetitive issue occurring on the computing device; and responsive to determining that the non-compliance issue is a repetitive issue occurring on the computing device, open a security incident associated with the repetitive issue and the computing device, wherein the security incident includes at least an immediate notification to at least one stakeholder associated with the computing device concerning possible malicious activity occurring on the computing device.

17. The computer system of claim 16, wherein the repetitive issue is an issue that occurs more than a threshold number of time within a predetermined time period.

18. The computer system of claim 15, wherein the program instructions to analyze the computing device based on the regulatory profile and on regulatory compliance for the entity associated with the computing device, comprise:

program instructions to transmit a set of commands to a plurality of computing devices to collect regulatory compliance data associated with each computing device of the plurality of computing devices;

program instructions to execute the set of commands at an operating system level of each computing device of the plurality of computing devices;

program instructions to collect a set of results associated with the executed set of commands;

program instructions to store the collected set of results; and program instructions to compare the stored set of results to a set of regulations included in a site regulatory profile to determine a regulatory compliance of each computing device in the plurality of computing devices.

19. The computer system of claim 15, further comprising program instructions stored on the one or more computer readable storage media for execution by at least one of the one or more computer processors, to:

determine one or more regulations applicable to at least one entity, wherein the creation of the regulatory profile is based on analyzing the determined one or more regulations applicable to the at least one entity;

query the one or more regulations to determine an individual that must comply, when the individual must comply, and associated unknown regulations;

determine one or more regulations applicable to at least one computing device of a plurality of computing devices of the entity based on at least the regulatory profile and the query; and create a respective regulatory profile associated with the computing device based on analyzing the determined one or more regulations applicable to the at least one computing device.

20. The computer system of claim 19, wherein the program instructions to determine one or more regulations applicable to at least one entity, comprise:

program instructions to receive a set of configuration data associated with at least one entity;

program instructions to retrieve a set of public data associated with the at least one entity from available public records associated with the at least one entity;

program instructions to retrieve a set of private data associated with the at least one entity from available proprietary records associated with the at least one entity;

program instructions to analyze the received set of configuration data, the retrieved set of public data, and the retrieved set of private data; and program instructions to determine one or more regulations applicable to at least one entity based on the analyzed set of configuration data, the analyzed set of public data, and the analyzed set of private data.

* * * * *